United States Patent [19]

Mahajan

[11] Patent Number: 5,404,528

[45] Date of Patent: Apr. 4, 1995

[54] SCRIPTING SYSTEM

[75] Inventor: Rakesh Mahajan, Laguna Hills, Calif.

[73] Assignee: Canon Information Systems, Inc., Costa Mesa, Calif.

[21] Appl. No.: 5,767

[22] Filed: Jan. 19, 1993

[51] Int. Cl.$^6$ ................................................ G06F 9/45
[52] U.S. Cl. ............................. 395/650; 364/DIG. 1; 364/280
[58] Field of Search ........................ 395/700; 371/25.1

[56] References Cited

U.S. PATENT DOCUMENTS 4,617,663 10/1986 Lake et al. ........................ 371/25.1

*Primary Examiner*—Thomas M. Heckler
*Attorney, Agent, or Firm*—Fitzpatrick, Cella, Harper & Scinto

[57] ABSTRACT

A scripting system for scripting functionality in an application program. A script interpreter which is instantiated as an object separate from the application program is provided to interpret scripts. The script interpreter contains a list of scripts that may be invoked and a list of corresponding trigger events that cause the scripts to be invoked. The scripts, which are separate from both the application program and the script interpreter, contain script language commands which include commands to execute functions in the application program. The application program is responsible both for defining the functions that it will make available for execution from scripts, as well as for indicating to the script interpreter that a particular type of event has occurred. In response to an indication from the application program that a trigger event has occurred, the script interpreter will interpret the appropriate script to execute the scripting commands, and in particular to execute application program functions when they are encountered in the script.

58 Claims, 6 Drawing Sheets

SCRIPT CallOut

WHEN OutGoingCallEvent

IF CallType is not VOICE
      Return ( )

END
Set("Retries:,5)
Set("fRecord, FALSE)
SetEvent("MakeCall")

FIG.4a

SCRIPT MakeACall

WHEN MakeCall

IF Retries is 0
      Return( )

END
MakeCall(" Hello, this is Rakesh's machine calling.
      I am trying to reach $who for Rakesh.
      If you are $who press 1.
      If you can call $who to the phone press 2 and tell $who
          to press 1 after picking up the phone.
      If you want to give me a message press 3, otherwise
          press 4 and hang up.
      Thank you.")

IF Status is BUSY
      Pause(200)
      SetEvent("MakeCall")

END

IF Status is OK
      Pause(100)
      SetEvent("ListenEvent")

END

FIG.4b

SCRIPT Listen

WHEN ListenEvent
ReadDTMF( )

IF Status is not OK
    Abort( )

END

IF DTMFInput is 1
    Set("TTSOut", "Local")
    PlayTTS("Jim is on the line")
    Abort( )

END

IF DTMFInput is 2
    Pause(300)
    SetEvent("ListenEvent")

END

IF DTMFInput is 3
    Set("TTSOut", "Phone")
    PlayTTS("Speak your message and then press 4 at the end")
    SetEvent("Record Event")

END

IF DTMFInput is 4
    Set("TTSOut", "Phone")
    PlayTTS("Goodbye and thank you")
    CallScript("EndRecording")
    Abort( )

END

FIG.4c

SCRIPTING SYSTEM

BACKGROUND OF THE INVENTION

1. Field of the Invention

The present invention relates to a scripting system by which the functionality present in an application program may be executed via a script. More particularly, the invention pertains to a scripting system in which the application program designates the functionality that may be invoked by a script, and in which a script interpreter, which is instantiated as an object separate from the application program, contains a list of scripts that may be invoked and a list of corresponding events that cause the script to be invoked. The application program signals that events have occurred to the script interpreter which, in turn, interprets corresponding scripts.

2. Description of the Related Art

In an effort to permit users of application programs to customize the functionality of the programs, application programs have recently allowed users to write customized scripts. The scripts include a sequence of script commands such as commands to invoke functionality of the application program, and allow the user to specify how the application program operates. With scripts, a user can customize the application program to meet specific demands of the implementation. Examples of scripts include macros for word processing programs such as WordPerfect® or Word for Windows®, and macros for spreadsheet programs such as Lotus® 1-2-3.

Such scripts, however, are tightly bound to their associated application programs. "Tightly bound" means that the script is designed only for one specific application program. Thus, both the script language that is used in the script as well as the functionality that may be invoked from the script are both defined in the context of one application program.

Because script are tightly bound to their application program, difficulties have arisen in the use of scripts. For example, the script language cannot be used in another application program which ordinarily will define its own scripting language. Further, it is not now possible for a script invoked from one application program to use functionality of another application program.

SUMMARY OF THE INVENTION

It is an object of the present invention to address these difficulties through the provision of a dynamically binding scripting system.

According to one aspect of the invention, a script interpreter which is instantiated as an object separate from the application program is provided to interpret scripts. The script interpreter contains a list of scripts that may be invoked and a list of corresponding trigger events that cause the scripts to be invoked. The scripts, which are separate from both the application program and the script interpreter, contain script language commands which include commands to execute functions in the application program. The application program is responsible both for defining the functions that it will make available for execution from scripts, as well as for indicating to the script interpreter that a particular type of event has occurred. In response to an indication from the application program that a trigger event has occurred, the script interpreter will interpret the appropriate script to execute the scripting commands, and in particular to execute application program functions when they are encountered in the script.

According to this aspect, the invention provides a scripting system for scripting application program functionality. A library list is formed, the library list including an entry point for each function that the application program will make available to scripts. A script interpreter is instantiated, the script interpreter being responsive to trigger events such that in response to a trigger event the script interpreter begins to interpret an attached script. Scripts are attached to the script interpreter, the scripts defining a script trigger event by which the script is triggered and including script commands such as commands to execute the exported application functionality. The script interpreter cross-indexes the list of attached scripts with correlated trigger events. In response to an application program detecting a trigger event and signalling the script interpreter that a trigger event has been detected, the script interpreter interprets the script commands in the script corresponding to the trigger event, and executes any application program functionality that is encountered in the script based on the entry point defined in the library list.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 4a, 4b and 4c are representative scripts.

DETAILED DESCRIPTION OF THE PREFERRED EMBODIMENT

Figure 1:
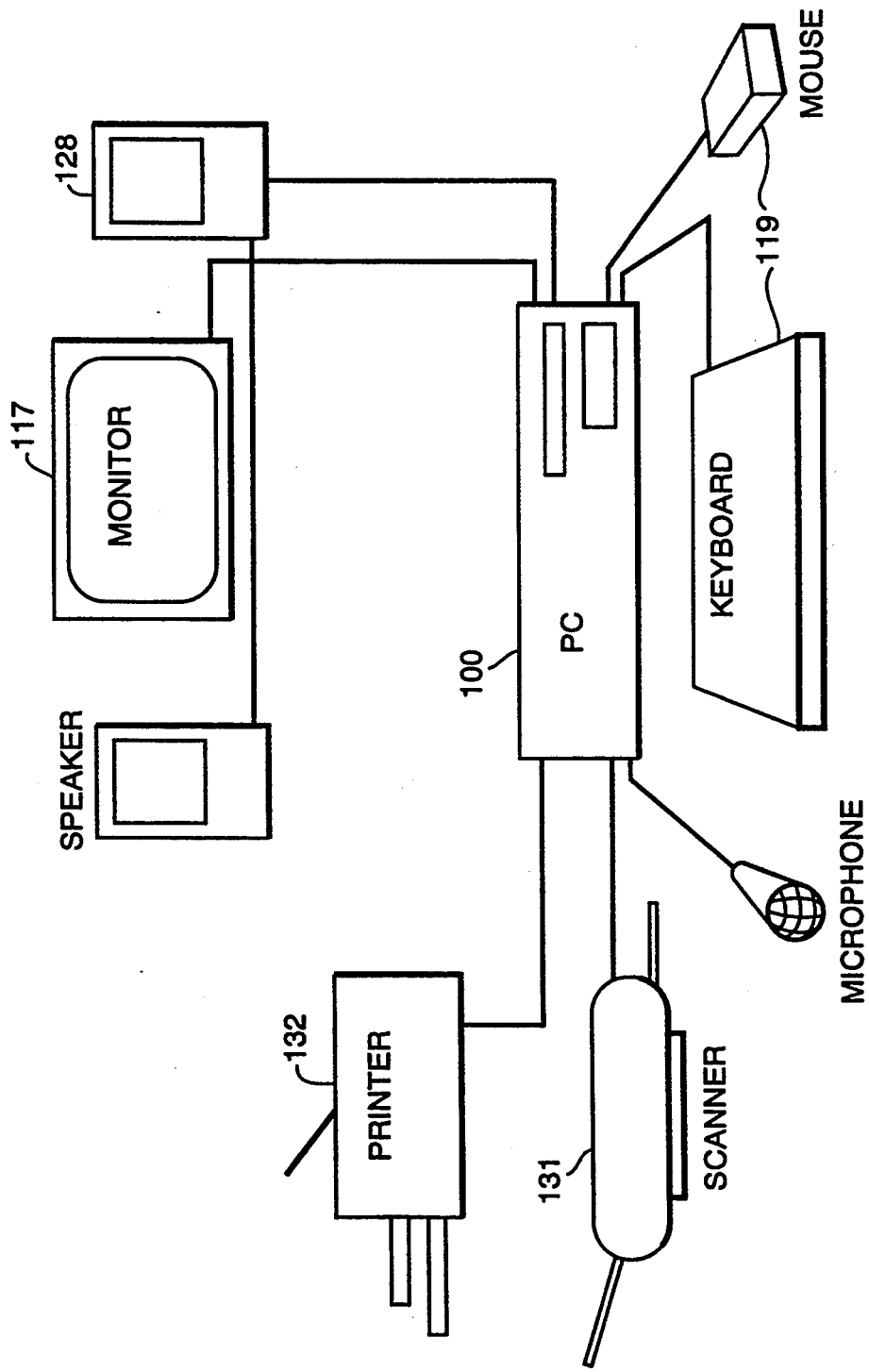
FIG. 1 is perspective view of the outward appearance of an apparatus according to the invention.
Figure 2:
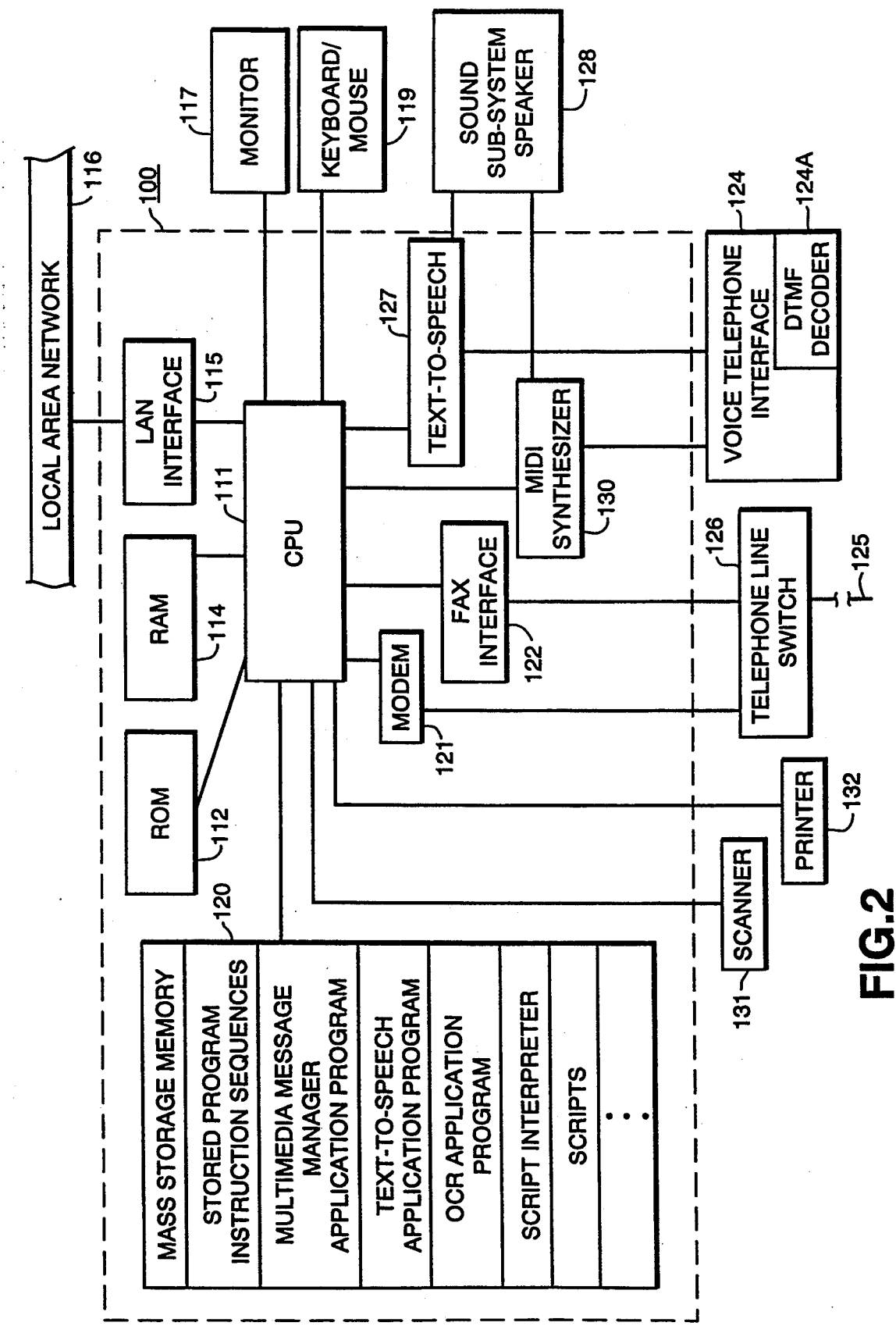
FIG. 2 is a block diagram of the FIG. 1 apparatus.

FIGS. 1 and 2 show an apparatus according to the present invention in which application program functionality is made available for execution from a script interpreter in accordance with commands in a script. As shown in these figures, reference numeral 100 designates personal computing equipment such as an IBM PC or PC-compatible computer. While it is preferred to implement the invention in such personal computing equipment, it is to be understood that the invention may be incorporated into dedicated and/or stand-alone computing equipment.

Computing equipment 100 includes a CPU 111 such as an 80386 processor which executes stored program instructions such as operator selected applications programs that are stored in RAM 114 or specialized functions such as start-up programs or BIOS which are stored in ROM 112. Computing equipment 100 further includes a local area network interface 115 which provides interface to a local area network 116 whereby the computing equipment 100 can access files on a remote file server or send files for remote printing or otherwise interact with a local area network in accordance with known techniques such as by file exchange or by sending or receiving electronic mail. Computing equipment 100 further includes a monitor 117 and a keyboard/mouse 119 for allowing operator manipulation and input of information.

Mass storage memory 120, such as a fixed disk or a floppy disk drive, is connected for access by CPU 111. Mass storage 120 typically includes stored program instruction sequences such as an instruction sequence according to the invention for exporting application program functionality to a script, as well as stored program instruction sequences for a variety of application programs such as multimedia message manager application programs, text-to-speech conversion application programs, optical character recognition ("OCR") application programs, and the like. In particular, the multimedia message manager application program provides capability for creating, editing and displaying multimedia messages in a multi-media environment and for sending and receiving multi-media messages via different transmission media including facsimile, voice telephone and modem. Other information and data processing programs may be stored in mass storage device 120. Data may also be stored on mass storage memory 120 as desired by the operator.

A modem 121, a facsimile interface 122, and a voice telephone interface 124 are provided so that CPU 111 can interface to an ordinary telephone line 125. Each of the modem 121, facsimile interface 122, and voice telephone interface 124 are given access to the telephone line 125 via a telephone line switch 126 which is activated under control by CPU 111 so as to connect telephone line 125 to one of the modem 121, the facsimile 122, or the voice telephone interface 124, as appropriate to the data being sent and received on the telephone line. Thus, CPU 111 can send and receive binary data such as ASCII text files or document images files via modem 121, it can send and receive facsimile messages via facsimile interface 122, and it can interact on an ordinary voice telephone line via voice telephone interface 124. In this regard, voice telephone interface 124 is provided with a DTMF decoder 124a so as to decode tones on the voice telephone line 125 which correspond to operator depressions of a telephone touch-tone capable keypad. In accordance with stored program instruction sequences in mass storage memory 120, the decoded tones are interpreted by CPU 111 into operator commands, and those operator commands are executed so as to take predesignated actions in accordance with operator depressions of the telephone keypad.

A conventional text-to-speech convertor 127 is connector to the CPU 111. The text-to-speech convertor 127 interprets text strings that are sent to it and converts those text strings to audio speech information. The text-to-speech convertor 127 provides audio speech information either to a speaker 128 for enunciation to a local computer operator, or provides audio speech information to the voice telephone interface 124 for enunciation over ordinary voice telephone lines.

MIDI ("Musical Instrument Digital Interface") synthesizer 130 is also connected to CPU 111 and interprets MIDI music commands from CPU 111 so as to convert those MIDI music commands to audio wave forms. The audio wave forms are, in turn, played out over speaker 128 or provided to voice telephone interface 124 for play out over ordinary voice telephone lines.

Scanner 131 operates to scan original documents printed on a sheet of paper, and to convert the information of those original documents into a bit-by-bit computer readable representation of that document. Scanner 131 may be a simple black and white scanner, but more preferably scanner 131 includes at least half-tone (grey scale) processing capabilities and/or color processing capabilities.

Printer 132 is provided to form images of documents under the control of CPU 111. Printer 132 may be an ordinary black and white printer, but, more preferably, printer 132 includes half-tone and/or color capabilities.

Figure 3:
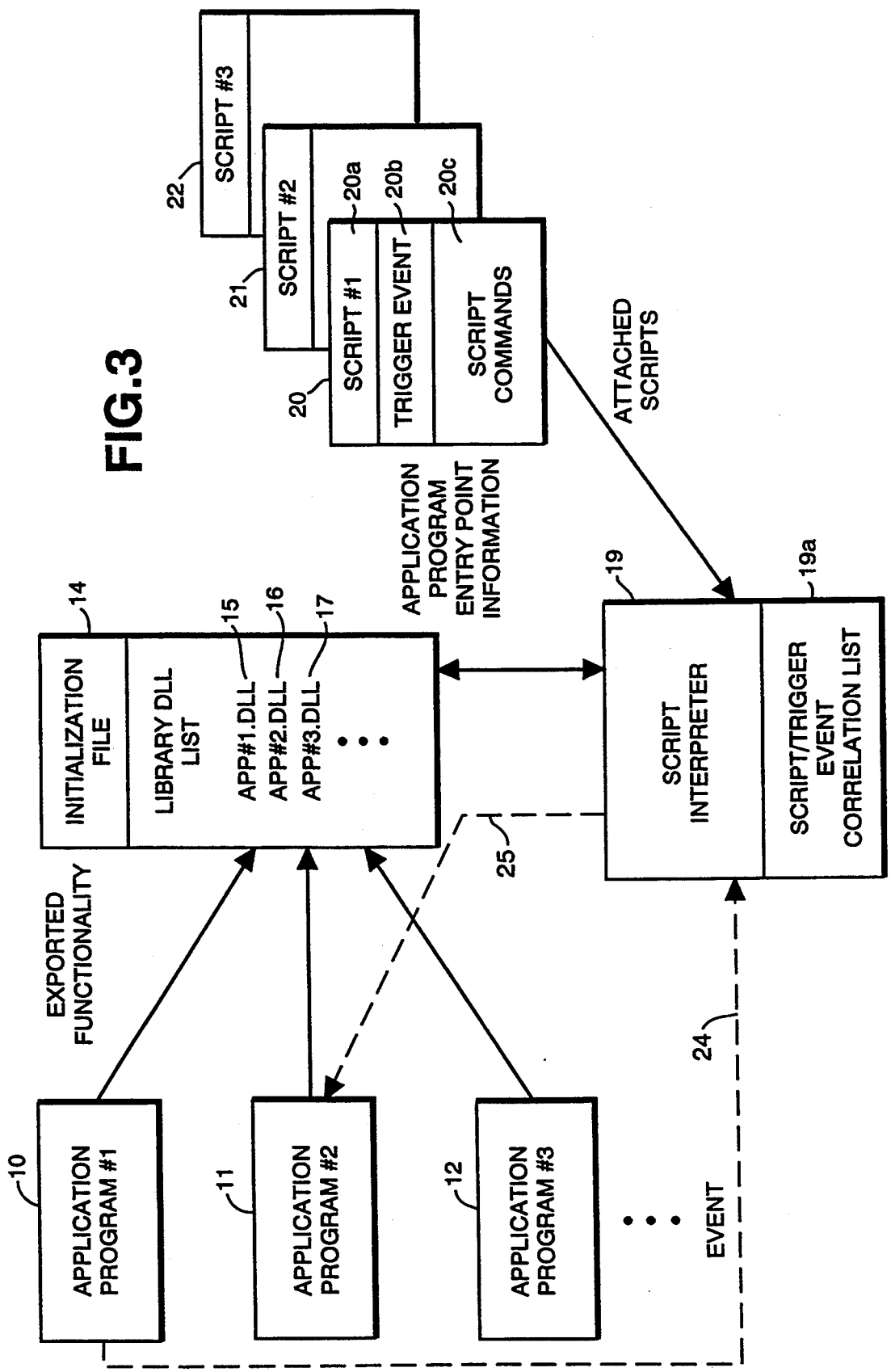
FIG. 3 is a representational view showing the functional interdependence of application programs, a script interpreter, and scripts.

FIG. 3 is a representational view of the functional interdependence of application programs, the script interpreter, and scripts in accordance with the present invention. In FIG. 3, application programs 10, 11 and 12 are application programs stored in mass storage memory 120, such as an application program for managing multimedia messages, an application program for performing text-to-speech conversion of arbitrary text files, and an application program for performing optical character recognition ("OCR") processing on arbitrary image files. Each of these application programs includes various blocks of functionality. Some of those blocks of functionality are made available for execution from a script, and those blocks of functionality are hereinafter referred to as "exported functionality". Each of the application programs defines entry points for the exported functionality into a script initialization file, such as a Windows ® ".INI" file, by inserting the entry point in a dynamic link library list (hereinafter "DLL list"). Thus, as shown in FIG. 3, a script initialization file 14 includes a DLL list 15 for application #1, a DLL list 16 for application #2, and DLL list 17 for application #3.

Each application program that makes scripting available to a user instantiates a script interpreter object. One such script interpreter object 19 is illustrated in FIG. 3 and is the script interpreter object instantiated by application #1. The script interpreter interprets script language, such as the script language attached hereto in Appendix A, and executes the function statements that are encountered in scripts. At least two types of function statements are provided in this embodiment: a utility function and an exported application program function. Utility functions are pre-defined library functions such as those set forth in Appendix B attached hereto. The utility functions make basic functionality available to a script user.

Exported application program functions are those functions that each of the application programs has exported and has listed in initialization file 14. When script interpreter 19 encounters an exported application program function, script interpreter 19 refers to initialization file 14 to obtain the proper entry point for the function, and then executes the designated function.

Scripts, such as scripts 20, 21 and 22, are attached to the script interpreter 19. Each script includes a script name by which the script may be accessed by the script interpreter, and also includes a script trigger event which specifies the event upon occurrence of which the script will be invoked. Thus, as seen in FIG. 3, script 20 includes script name 20a, script trigger event 20b, and script commands 20c, all of which are specified in Appendix A.

As each script is attached to the script interpreter 19, the script interpreter forms a correlation list by which script names are correlated to their associated trigger event. Thus, as seen in FIG. 3, script interpreter 19 includes a script/trigger event correlation list 19a. By reference to the correlation list, script interpreter 19 invokes the appropriate one of the attached scripts based on occurrence of a trigger event.

Trigger events are signalled to the script interpreter by the application programs. Thus, as seen in FIG. 3, application program 10 signals a trigger event 24 to script interpreter 19. Based on the trigger event and the script/trigger event correlation list 19a, script interpreter 19 begins interpreting one of its attached scripts. More specifically, the script commands in the triggered script are interpreted line by line until a function statement is encountered. If the function statement is a utility function, then script interpreter 19 executes the utility function in accordance with the specifications of Appendix B. On the other hand, if the function statement encountered is an exported application program function, then script interpreter 19 refers to initialization file 14 so as to obtain an entry point into the appropriate application function. Using the entry point, the script interpreter 19 executes the exported functionality as indicated at 25. After execution of the exported functionality has been completed, control returns to script interpreter 19 which continues to interpret the succeeding line of the invoked script.

As seen in FIG. 3, initialization file 14 includes a DLL list for each of the applications that has exported functionality to the scripting system. Thus, for example, even though application program 10 has detected the triggering event 24, it is possible for the script that is invoked based on the triggering event to execute functionality from different application programs, such as application program 11. Indeed, any of the scripts attached to script interpreter 19 can access any of the exported functionality from any of the application programs, so long as that exported functionality is provided with an entry point in one of the DLL lists in initialization file 14.

Figure 5:
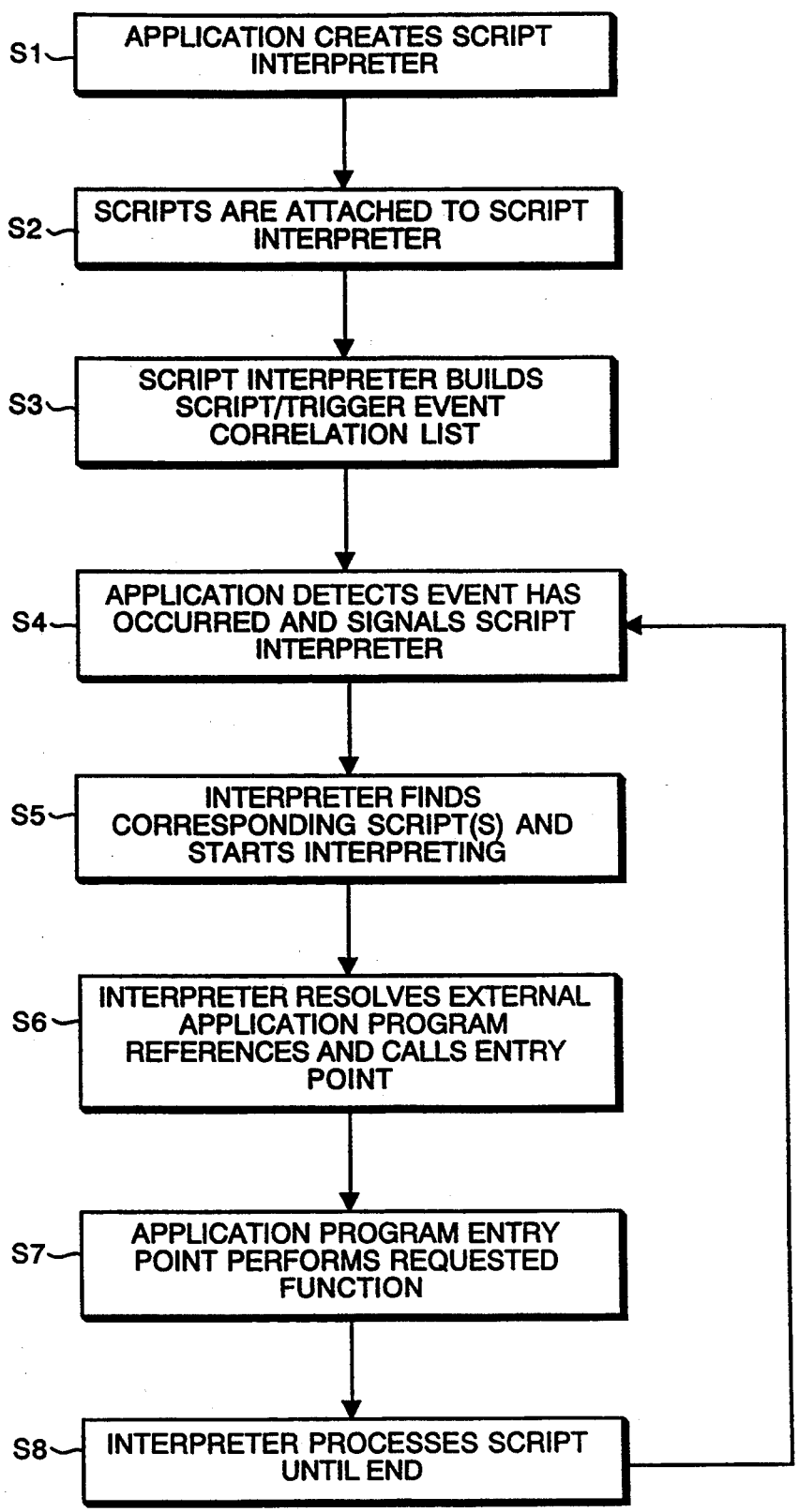
FIG. 5 is a flow diagram for explaining script processing according to the invention.

FIG. 4 is a representative script according to the invention, and FIG. 5 is a flow diagram illustrating script processing according to the invention. The script depicted in FIG. 4 is used to make a voice telephone call over voice telephone interface 124, play out a greeting requesting for a named person to come to the telephone, and in response to DTMF signals detected on the voice telephone line, generate voice messages. The named person is represented in the scripts by the variable "who" prefixed by token "$" which causes script interpreter 16 to replace the string "$who" with the value of the variable "who", here, the person's name. Variables and variable values are preferably retrieved and stored using the container-based exchange system described in my co-pending application entitled "CONTAINER-BASED METHOD FOR EXCHANGING INFORMATION BETWEEN COMPUTER PROCESSES", filed on even date herewith, the contents of which are incorporated by reference as if set forth in full herein.

As shown in FIG. 4, three scripts are provided: a "CallOut" script, a "MakeACall" script and a "Listen" script. Each of these scripts is triggered by respective trigger events "OutGoingCallEvent" "MakeCall" and "ListenEvent" The "OutGoingCallEvent" is generated by one of the application programs executing in CPU 111, for example, a multimedia message management program.

In step S1, the application program creates a script interpreter object such as script interpreter 19 to interpret scripts. Because the application program is invoking scripts, it already has exported functionality by providing DLL lists in a script initialization file such as initialization file 14.

In step S2, scripts are attached to the script interpreter. As described above in connection with FIG. 3, the script interpreter generates a correlation list which correlates script names to trigger events by which those scripts are invoked (step S3). Thus, in consideration of the scripts shown in FIG. 4, the script interpreter generates a script/trigger event correlation list which correlates the CallOut script with the OutGoingCallEvent trigger event, which correlates the MakeACall to the MakeCall event, and which correlates the Listen script to the ListenEvent event.

In step S4, during execution of the application program, the application program detects that an event has occurred and signals the script interpreter that the detected event has occurred. In response to event detection, flow advances to step S5 in which the script interpreter finds the scripts that correspond to the detected event by reference to the script/trigger event correlation list. Thus, for example, with reference to the scripts shown in FIG. 4, when an OutGoingCallEvent is detected by the multimedia message management program, script interpreter 19 determines that the CallOut script should be invoked, and commences interpretation of the script commands in the CallOut script. Interpretation of the scripts continues until function statements are encountered. In the example of FIG. 4, the "SetEvent" function statement is such a statement.

In response to detection of a function statement, the script interpreter determines whether the function statement is a utility function statement or an application program function statement. "SetEvent" is a utility function statement (see Appendix B) and, accordingly, the script interpreter executes the function in accordance with its internal library of utility functions. In this case, the result of execution is to trigger the MakeCall event.

In response to the MakeCall event, script interpreter 19 activates the script that is triggered by the MakeCall event, here the MakeACall script, and begins interpreting script commands in that script. As before, script interpretation continues until a function statement is encountered, here, the MakeCall function statement. As before, script interpreter 19 determines whether the MakeCall function statement is a utility function or an exported application program function.

In this instance, the MakeCall function is an exported application function. Accordingly, as shown in step S6, the script interpreter resolves the external application function reference by reference to initialization file 14 and calls the appropriate entry point in the appropriate application program. In the present situation, MakeCall is an exported application function from the multimedia message management application program, and accordingly script interpreter 19 causes execution of that functionality, whereby the indicated message is played out over voice telephone interface 124.

As shown in the FIG. 4 scripts, the MakeCall exported functionality attempts to place the telephone call, but if the telephone line is busy (status=busy), then the script interpreter pauses 20 seconds and then again sets the MakeCall event so as to attempt another call. On the other hand, if the call has been placed and the message has been played out (status=ok) then the script interpreter pauses 10 seconds and sets the ListenEvent.

In response to detection of the ListenEvent, the script interpreter invokes the Listen script, again through reference of the script/trigger event correlation list. The script interpreter interprets the script commands in the Listen script until it encounters a functional statement, here the ReadDTMF functional statement. In accordance with the processing described above, the script interpreter determines that the ReadDTMF function statement is an exported application program functionality and accesses the appropriate entry point for that functionality via the initialization file 14. In accordance with the returned value of the DTMF signal on the voice telephone line 125, one of four actions is taken. In particular, if DTMF input=1, then script interpretation proceeds until the script interpreter encounters the PlayTTS functional statement. The script interpreter determines that the PlayTTS functional statement is not a utility function but rather is an exported application function, and via initialization file 14 obtains the entry point for the exported functionality. In this situation, PlayTTS functionality is not exported from the multimedia message management application program, but rather is exported from a text-to-speech conversion application program. But because the exported functionality is listed in the DLL list in initialization file 14, the script interpreter 19 is still able to access the desired entry point for the functionality.

In step S8, script interpreter 19 processes the script until all scripts, including nested scripts as above, have been completed. Flow thereupon returns to step S4 to await further signalling that an event has occurred.

APPENDIX A: Script Language

Each Script has the following format:

```
SCRIPTNAME <Name>
WHEN <Event>
<ScriptStatement>
<ScriptStatement>
<ScriptStatement>
```

Each <ScriptStatement> can be either a <ConditionalStatement> or a <FunctionStatement>.

<ConditionalStatements> have the following format:

```
<ConditionalStatement>:=IF<Condition> THEN
                         <ScriptStatement>
                       ELSE
                         <ScriptStatement>
                       END
``` and thus can include further <ConditionalStatements> and <FunctionStatements>.

<FunctionStatements> are either calls to utility functions or calls to application program-defined functions, as listed in the dynamic link library initialization file.

APPENDIX B: Utility Functions

Abort

This function aborts script processing, displays AbortMessage in a message box, and returns to the client program that initiated the script processing. If AbortMessage is NULL, no message box is displayed.

| Abort (AbortMessage,fLog) | |
|---|---|
| AbortMessage | the string to be output in the message box. |
| fLog | set to TRUE if the message is to be logged. (where?!) |

CallScript

This function causes a script to be interpreted from within a script. This mechanism is used to directly cause another script to be interpreted as opposed to the SetEvent function. Interpretation of the script calling CallScript will be halted temporarily until the script handling the event completes.

| CallScript (ScriptName) | |
|---|---|
| ScriptName | the name of the script being called. |

DestroyVar

This function causes a variable to be removed.

| DestroyVar (VariableName) | |
|---|---|
| VariableName | the name of the variable being destroyed. |

IsEventSet

This function returns TRUE if EventName has been set and FALSE otherwise.

| IsEventSet (EventName) | |
|---|---|
| EventName | the name of the event being checked. |

Exit

This function exits script processing and returns to the client program that initiated the script processing.
Exit ()
MessageBox This function puts up a message box with Message in it.

| MessageBox (Message,Title,Style) | |
|---|---|
| Message | the string to be output in the message box. |
| Title | the string to be output as the title of the message box. |
| Style | Windows ® MB styles supported here. |

Pause

This function causes script interpretation to pause until the time expires.

| Pause (time) | |
|---|---|
| time | the amount of time to pause in 10ths of a second. |

Return

This function stops interpreting the current script. If the script was being interpreted as a result of being called (directly or indirectly) from another script this function will cause the ScriptInterpreter to resume processing of that script. If script processing was initiated from a client program the ScriptInterpreter will return to the client program.
Return ()
Set This function sets the value for a variable. If the variable exists the current value is overwritten with the new value. If the variable does not exist it is created and set to the required value.

| Set (VariableName, value) | |
|---|---|
| VariableName | the name of the variable whose value is being set. |
| value | what the variable is being set to. This may be a string, a number or another variable. |

SetEvent

This function causes an event to be set. If there is a script for that event the ScriptInterpreter will start interpreting that script. This mechanism allows for a script to indirectly cause another script to be interpreted. Interpretation of the script calling SetEvent will be halted temporarily until the script handing the event completes.

| SetEvent (EventName) | |
|---|---|
| EventName | the name of the event being triggered. |

SetEventDeferred

This function causes an event to be set. If there is a script for that event the ScriptInterpreter will start interpreting that script after it has finished processing the current script.

| SetEventDeferred (EventName) | |
|---|---|
| EventName | the name of the event being triggered. |

IsVariable

This function returns TRUE if VariableName exists and FALSE otherwise.

| IsVariable (VariableName) | |
|---|---|
| VariableName | the name of the variable being checked for existence. |

What is claimed is:

1. A computer—implemented method for scripting an application program function comprising the steps of:
   instantiating a script interpreter, the script interpreter being responsive to a trigger event such that in response to the trigger event the script interpreter interprets scripts commands in an attached script;
   attaching a script to the script interpreter, the script defining a script event by which the script is triggered, the script further including script commands including a command to execute the application program function; and
   executing the application program to detect a trigger event and providing the script interpreter with the detected trigger event.

2. A method according to claim 1, further comprising the step of executing the script interpreter in response to detection of a trigger event to interpret corresponding scripts.

3. A method according to claim 2, wherein in said executing step, in response to interpreting a command to execute the application program function, the script interpreter invokes the application program function.

4. A method according to claim 1, further comprising the step of forming a library list which includes an entry point for the application program function.

5. A method according to claim 4, wherein the script interpreter refers to the library list in response to interpreting a script command to execute the application program function.

6. A method according to claim 4, wherein the library list forming step includes the step of forming a library list of entry points for utility functions, and wherein the attached script includes script commands to execute utility functions.

7. A method according to claim 6, wherein the script interpreter refers to the library list in response to interpreting a script command to execute the utility function.

8. A method according to claim 6, wherein the utility functions include a function to set a trigger event.

9. A method according to claim 6, wherein the utility functions include a function to invoke another script.

10. A method according to claim 6, wherein the utility functions include a function to determine whether an event is set.

11. A method according to claim 4, wherein said library list forming step includes the step of forming a library list which includes entry points for a function from a second application program.

12. A method according to claim 11, wherein the script interpreter refers to the library list in response to interpreting a script command to execute the function exported from the second application program.

13. A method according to claim 1, wherein script commands include commands to execute utility functions.

14. A method according to claim 13, wherein the utility functions include a function to set a trigger event.

15. A method according to claim 13, wherein the utility functions include a function to invoke another script.

16. A method according to claim 13, wherein the utility functions include a function to determine whether an event is set.

17. A method according to claim 1, wherein the script commands include commands to execute a function from a second application program.

18. A computer—implemented method for scripting exported application program functions comprising the steps of:
   forming an initialization file that includes a dynamic link library list for an entry point to the exported application program function;
   instantiating a script interpreter, the script interpreter being responsive to a trigger event to trigger an attached script;
   attaching a script to the script interpreter, the script defining a script event by which the script is triggered, the script further including script commands including commands to execute the exported application program function;
   indexing into the script interpreter a correlation list of attached scripts and script events by which the attached scripts are triggered;
   executing the application program to detect a trigger event and providing the script interpreter with the detected trigger event; and executing the script interpreter in response to a detected trigger event, said executing step including the step of interpreting the script commands in the attached script that corresponds to the trigger event listed in the correlation list of attached scripts, said interpreting step including the step of executing the exported application program function based on the entry point listed in the dynamic link library in response to interpreting a script command to execute the exported application program function.

19. A method according to claim 18, wherein said initialization file forming step includes the step of forming an initialization file of entry points for utility functions, and wherein the attached script includes script commands to execute utility functions.

20. A method according to claim 19, wherein the script interpreter refers to the initialization file in response to interpreting a script command to execute the utility function.

21. A method according to claim 19, wherein the utility functions include a function to set a trigger event.

22. A method according to claim 19, wherein the utility functions include a function to invoke another script.

23. A method according to claim 19, wherein the utility functions include a function to determine whether an event is set.

24. A method according to claim 18, wherein said initialization file forming step includes the step of forming an initialization file to entry points for a function exported from a second application program.

25. A method according to claim 24, wherein the script interpreter refers to the initialization file in response to interpreting a script command to execute the function exported from the second application program.

26. A method according to claim 18, wherein script commands include commands to execute utility functions.

27. A method according to claim 26, wherein the utility functions include a function to set a trigger event.

28. A method according to claim 26, wherein the utility functions includes a function to invoke another script.

29. A method according to claim 26, wherein the utility functions include a function to determine whether an event is set.

30. A method according to claim 18, wherein the script commands include commands to execute a function from a second application program.

31. A computerized apparatus for scripting exported functionality from an application program, said apparatus comprising:
a memory for storing (a) an application program which includes an entry point for the exported functionality, (b) a script interpreter, the script interpreter being responsive to a trigger event such that in response to the trigger event the script interpreter interprets script commands in an attached script, and (c) a script which defines a script event by which the script is triggered and which includes script commands to execute the exported functionality of the application program; and
a processor for instantiating the script interpreter, for attaching the script to the script interpreter, and for executing the application program so as to detect a trigger event and so as to provide the script interpreter with the detected trigger event;

wherein in response to the detected trigger event, the script interpreter interprets the script commands in the attached script so as to cause the exported functionality of the application program to be executed commencing from the entry point of the application program.

32. An apparatus according to claim 31, wherein said memory stores a library list which includes the entry point for the exported functionality of the application program.

33. An apparatus according to claim 32, wherein the script interpreter refers to the library list in response to interpreting a script command to execute the application program function.

34. An apparatus according to claim 32, wherein the library list includes entry points for utility functions, and wherein the attached script includes script commands to execute utility functions.

35. An apparatus according to claim 34, wherein the script interpreter refers to the library list in response to interpreting a script command to execute the utility function.

36. An apparatus according to claim 34, wherein the utility functions include a function to set a trigger event.

37. An apparatus according to claim 34, wherein the utility functions include a function to invoke another script.

38. An apparatus according to claim 34, wherein the utility functions include a function to determine whether an event is set.

39. An apparatus according to claim 32, wherein the library list includes entry points for a function from a second application program.

40. An apparatus according to claim 39, wherein the script interpreter refers to the library list in response to interpreting a script command to execute the function exported from the second application program.

41. An apparatus according to claim 31, wherein script commands include commands to execute utility functions.

42. An apparatus according to claim 41, wherein the utility functions include a function to set a trigger event.

43. An apparatus according to claim 42, wherein the utility functions include a function to invoke another script.

44. An apparatus according to claim 42, wherein the utility functions include a function to determine whether an event is set.

45. An apparatus according to claim 31, wherein the script commands include commands to execute a function from a second application program.

46. An apparatus for scripting exported functionality of an application program, said apparatus comprising:
a memory for storing (a) an application program which includes an entry point for the exported functionality, (b) an initialization file that includes a dynamic link library list for the entry point, (c) a script interpreter which is responsive to a trigger event so as to trigger an attached script, and (d) a script which defines a script event by which the script is triggered and which includes script commands including commands to execute the exported functionality of the application program; and
a processor for instantiating the script interpreter, for attaching the script to the script interpreter, for indexing into the script interpreter a correlation list of attached scripts and script events by which the attached scripts are triggered, and for executing the application program so as to detect a trigger event and so as to provide the script interpreter with the detected trigger event;

wherein in response to a detected trigger event, said processor executes the script interpreter so as to interpret script commands in an attached script that corresponds to the trigger event listed in the index correlation list of attached scripts, whereby the exported functionality of the application program is executed based on the entry point listed in the dynamic link library.

47. An apparatus according to claim 46, wherein the initialization file includes entry points for utility functions, and wherein the attached script includes script commands to execute utility functions.

48. An apparatus according to claim 47, wherein the script interpreter refers to the initialization file in response to interpreting a script command to execute the utility function.

49. An apparatus according to claim 47, wherein the utility functions include a function to set a trigger event.

50. An apparatus according to claim 47, wherein the utility functions include a function to invoke another script.

51. An apparatus according to claim 47, wherein the utility functions include a function to determine whether an event is set.

52. An apparatus according to claim 46, wherein the initialization file includes entry points for a function exported from a second application program.

53. An apparatus according to claim 52, wherein the script interpreter refers to the initialization file in response to interpreting a script command to execute the function exported from the second application program.

54. An apparatus according to claim 46, wherein script commands include commands to execute utility functions.

55. An apparatus according to claim 54, wherein the utility functions include a function to set a trigger event.

56. An apparatus according to claim 54, wherein the utility functions includes a function to invoke another script.

57. An apparatus according to claim 54, wherein the utility functions include a function to determine whether an event is set.

58. An apparatus according to claim 46, wherein the script commands include commands to execute a function from a second application program.

* * * * *